3,051,273
HYDRAULIC BRAKE
Ettore Cordiano and Giovanni Candellero, Turin, Italy, assignors to Fiat Societa per Azioni, Turin, Italy
Filed July 13, 1960, Ser. No. 42,544
Claims priority, application Italy July 15, 1959
2 Claims. (Cl. 188—90)

This invention refers to hydraulic brake comprising a bladed stator and rotor of the type employed in hydrodynamic couplings, with variable filling in accordance with the desired extent of braking action.

The brake is generally included in the means transmitting power from the engine to the wheels either ahead of the friction clutch or past the gearbox and effects braking of the vehicle by dissipating kinetic energy in the form of heat.

Dissipation of energy takes place in brakes of the type referred to by effect of hydro-dynamic actions of the hydraulic liquid (oil) in the brake on the stationary and movable conduits, respectively, of the stator or rotor. The braking torque acting on the rotor is increasingly dependent upon the speed of the rotor and quantity of oil in the gear.

The essential features of the improved brake reside in a circuit equipped with a pump for supplying oil from the reservoir to the rotor and a by-pass circuit for recirculating oil from the stator to the rotor through a heat exchanger which removes from the oil calories of heat corresponding to the braking performance, which are yielded to the engine cooling water, means being provided for intercepting all or part of the oil flow from the reservoir to the rotor of the brake and controlling outflow from the stator to the reservoir.

Further characteristic features and advantages of this invention will be understood from the appended detailed description with reference to the accompanying drawings given by way of a non-limiting example, wherein.

In the appended description similar or corresponding components are denoted by similar reference numerals.

Figure 1:
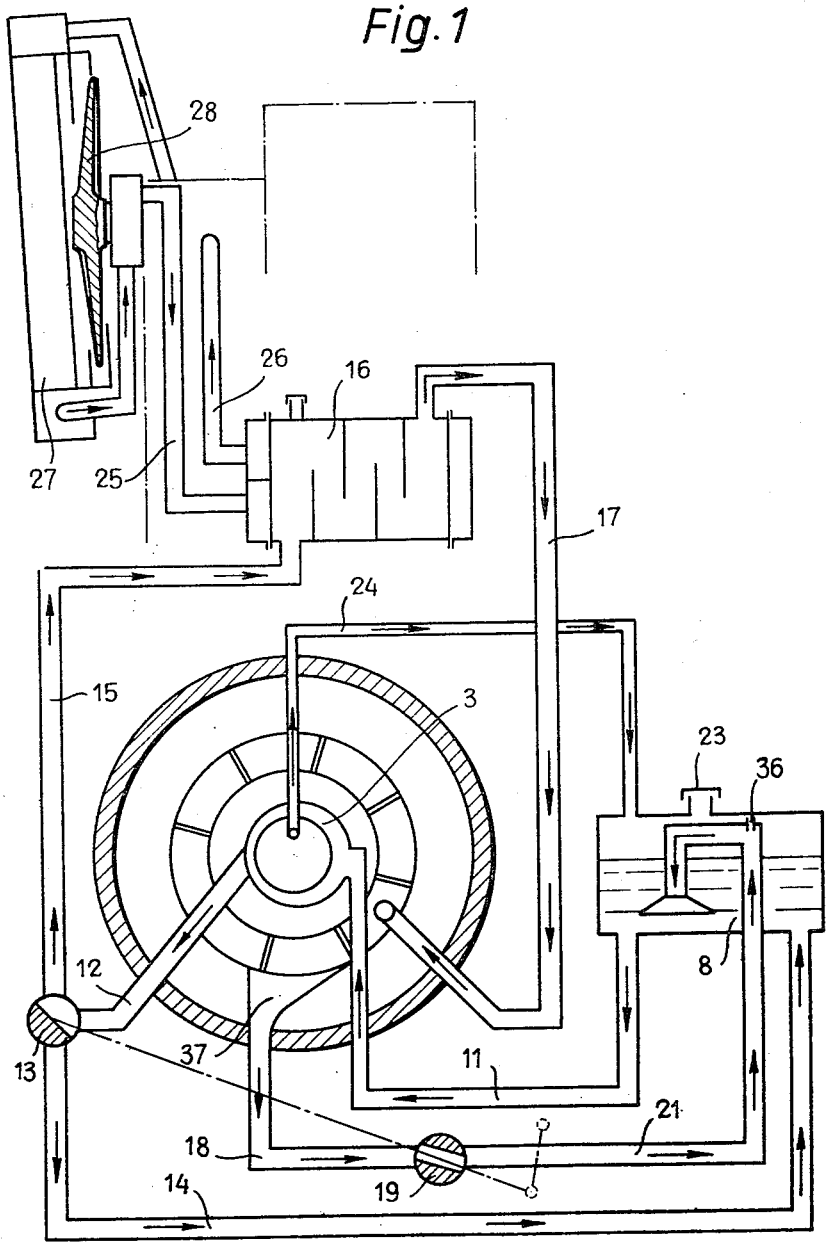
FIGURE 1 is a diagram of the hydraulic circuit of the brake.
Figure 2:
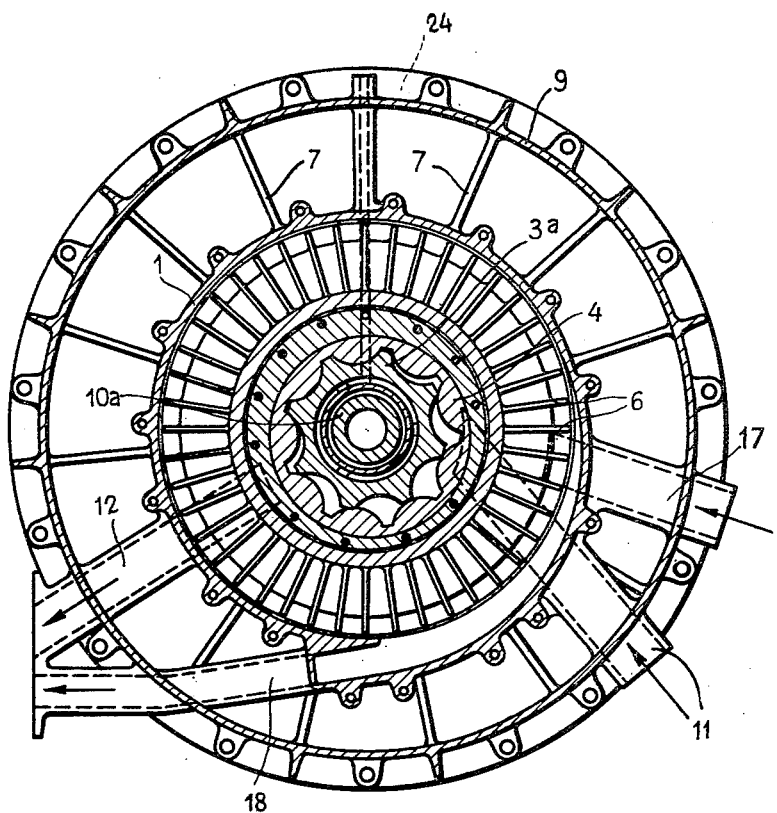
FIGURE 2 is a transverse sectional view of the brake on a plane perpendicular to the axis of rotation.
Figure 3:
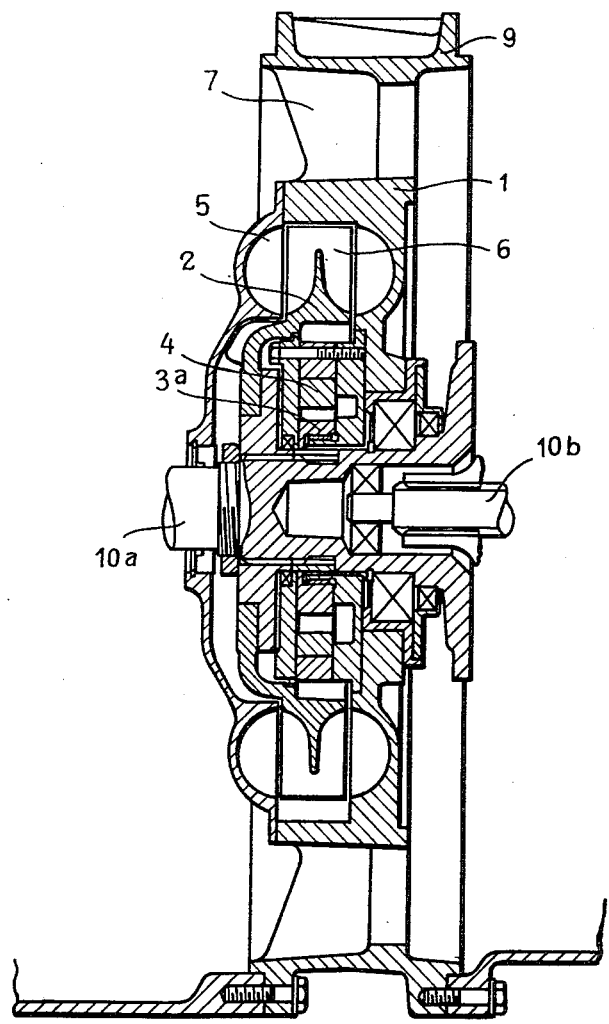
FIGURE 3 is a longitudinal sectional view of the brake.

Referring to FIGURES 1 to 3, references 1, 2 denote the stator and rotor of the hydrodynamic brake, respectively. The rotor 2 and stator 1 are equipped with radial blades 6, 5 respectively. The rotor 2 has keyed thereto a driving shaft 3a of a pump 3 of the volumetric internal gear type, the driven gear 4 of which is rotatably supported by the stator 1 of the slowing-down gear. The stator 1 is moreover provided with an outer toothed rim 9 connected with the stator body by means of spokes 7 which afford flow of a cooling air stream. The rotor 2 is keyed to a shaft 10a directly coupled with the engine shaft; a shaft 10b carries the friction discs of a friction coupling (not shown in the figure) and is connected through the primary shaft of a gearbox or a variable speed transmission.

References 11, 12 denote the suction conduit and delivery conduit, respectively, of the internal gear pump 3. The conduit 12 leads to a three-way valve 13 to which two conduits 14, 15 abut. The conduit 14 is adapted to short-circuit the pump delivery, the conduit 15 conveying the pump delivery through an external heat exchanger 16 and conduit 17 to the bladed region of the stator 1.

Outflow of oil from the brake is adjusted by means of a control and exhaust valve 19. The valve 19 connects two conduits 18 and 21 arranged to convey oil from the stator 1 to the reservoir 8.

The conduit 18 is moreover provided with a widemouthed intake 37 connecting it to the stator 1. The said intake 37 is adapted to establish a pressure gradient in the exhaust conduit 18 to promote emptying of the brake. The exhaust conduit 21 ends into the reservoir 8 by a syphon formed with an orifice 36 for the purpose of preventing backflow of oil to the brake. Reference 23 denotes an inlet for filling oil into the reservoir 8. The brake is moreover provided with a vent conduit 24 opening to the reservoir. Conduits 25 and 26 serve for circulating water from the engine radiator 27 to the heat exchanger 16. The radiator 27 is equipped with a fan 28 and cools, in addition to the motor-vehicle engine, the oil circulating in the brake during operation of the latter.

During normal drive with inoperative brake the control valves 13 and 19 are set to establish a shortcircuit between the pump 3 and reservoir 8 through conduits 11, 12 and 14, and quickly empty the stator 1 through conduits 18, 21, respectively.

For maximum braking a suitable operating lever is fully depressed. The operating lever, which is not shown on the drawing, is arranged on the instrument board of the vehicle. When the lever is in its depressed condition, short-circuiting is prevented, the valve 13 admitting oil flow through the conduit 15, whereas the exhaust valve 19 is throttled so that oil fills the cavity in the brake.

The bladed rotor which on braking is rotated by the vehicle wheels drives oil towards the periphery forcing it against the stator. The blades on the latter deflect oil and convey it to the rotor inlet, whereby a continuous oil circulation is established. This quick internal circulation establishes a resisting torque on the rotor, which brakes the vehicle. The energy corresponding to the braking perforance is absorbed in the form of heat by the oil itself.

The heat absorbed by the oil is transmitted through the oil-water exchanger 16 to the engine cooling water which is cooled in the radiator 27.

Variable control is effected by adjusting the throttling effect of the valve 19.

Emptying is effected by fully opening the valve 19 and switching the valve 13 to connect conduit 14 with conduit 12.

Figure 4:
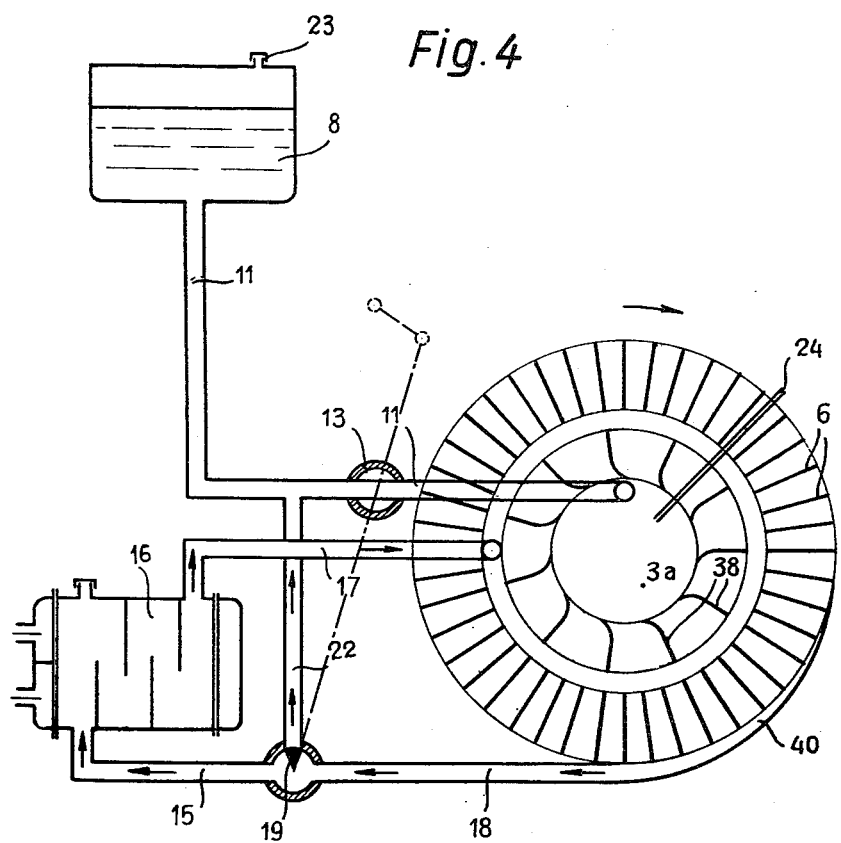
FIGURE 4 is a diagram showing a modification of the improved hydraulic circuit.
Figure 5:
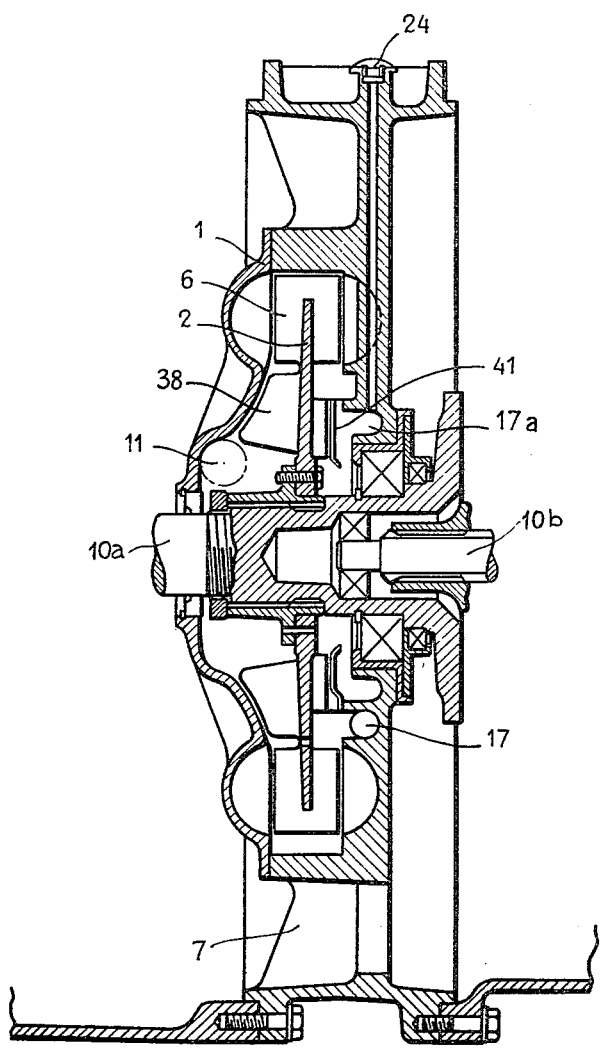
FIGURE 5 is a longitudinal sectional view of the brake on a plane containing the axis of rotation according to the modified construction shown in FIG. 4.

The modification shown in FIGURES 4 and 5 differs from the previously described construction primarily under two aspects. Firstly, delivery to the brake is now utilized in the cooling circuit of the heat exchanger, secondly, the internal-gear pump has been replaced by a centrifugal pump which effects quick and thorough filling at any speed.

According to the latter construction the rotor 2 of the slowing-down gear moreover acts as an impeller for the centrifugal pump. The rotor carries on both faces of its circumferential region blades 6 effective for slowing-down purposes in co-operation with the bladed regions of the stator 1. A plurality of blades 38 are arranged on the rotor over the annular region between the blades 6 and hub of the rotor and act as an impeller of the centrifugal pump.

The casting of the centrifugal pump is cast together with the stator 1 and is formed with the outlet for the suction conduit 11. A one-way valve 13 is interposed in the suction conduit 11 for intercepting oil flowing from the reservoir 8 to the pump impeller.

A wide-mouthed intake 40 is cast together with the casing of the stator 1 externally of the blading thereof and leads to an exhaust valve 19 for leading oil from the brake either to the conduit 15 connecting with the heat exchanger 16 or with the exhaust conduit 22 which opens into the conduit 11 leading to the reservoir 8.

Oil issuing from the heat exchanger 16 is returned to the brake direct through the conduit 17 opening into the annular space 17a surrounded by the blades 6 of the rotor 2, thereby by-passing the pump.

An inner baffle 41 is secured to the stator 1 which promotes air escape through the vent 24.

When the brake is set to maximum braking the two valves 13, 19 are set in the manner shown by FIGURE 4, wherein the intercepting valve 13 is open to interconnect the pump impeller and reservoir 8, the exhaust valve 19 being set to shut off the conduit 22 leading to the reservoir, admitting flow of all of the oil from the wide-mouth intake 40 to the heat exchanger 16 and subsequent recirculation to the brake through the conduit 17.

The reservoir 8 is arranged at a level higher than the brake, the resulting static head and action of the centrifugal pump affording quick and full filling of the brake. Oil circulation from the outlet of the stator 1 to the heat exchanger and from the latter to the rotor inlet during operation is considerably promoted through the provision of the wide-mouthed intake 40 which utilizes the dynamic pressure acting on the oil in order to return the oil to the blading of the brake direct, instead of conveying it through the reservoir at atmospheric pressure, thence to the pump as in the previously described construction.

Control of delivery is effected through gradual rotation of the exhaust valve 19 which returns to the reservoir part of the oil from the brake. Simultaneously with the valve displacement a rotation of the suction valve 13 may optionally take place.

During normal drive, when the brake is inoperative, the suction valve 13 is closed and exhaust valve 19 delivers all of the oil in the brake to the reservoir.

In order to simplify both control and construction the valves in either construction can be mechanically linked or combined within a common valve block for simultaneous operation.

What we claim is:

1. In a hydrodynamic brake for motor vehicles of the variable oil-filling type having a bladed rotor keyed to a vehicle drive shaft and a bladed stator enclosing said rotor, an oil reservoir, an oil pump for feeding oil to the bladed region of the rotor, and an external heat exchanger, a first conduit interposed between said reservoir and the inlet side of said pump, a wide-mouthed intake formed on the periphery of said stator outwardly of the periphery of said rotor, a second conduit interposed between said wide-mouthed intake and the inlet to said heat exchanger, a third conduit interposed between the outlet from said heat exchanger and a zone arranged inside the inner periphery of the rotor blades, a one-way valve arranged in said first conduit, a three-way valve arranged in said second conduit, a fourth conduit connecting one way of said three-way valve to a point in said first conduit situated between said one-way valve and said reservoir, and a vent connecting the inlet to said pump with the atmosphere, said valves being so arranged for said one-way valve to be open when said three-way valve leaves free the communication between said dynamic intake and said heat exchanger and intercepts said fourth conduit, and to be closed when said three-way valve leaves free the communication between said dynamic intake and said fourth conduit and simultaneously intercepts the communication with said heat exchanger, means being provided for simultaneously operating said valves to afford their above mentioned function.

2. In a hydrodynamic brake for motor-vehicles having a rotor and a stator enclosing said rotor, said rotor being formed by a disc subdividing the inside of the stator into two compartments communicating therebetween beyond the disc periphery, a set of radial blades carried by said disc projecting beyond its outer periphery and extending to some extent towards the rotor disc axis on both sides of the latter, a vehicle drive shaft extending throughout said stator coaxial therewith and having keyed thereto said rotor disc, two circular rows of stator blades each arranged at one side of said rotor blades and mounted in annular recesses provided in the stator walls, an oil reservoir and a heat exchanger situated externally of said stator, a circular row of auxiliary blades on one side of the rotor disc arranged inside the rotor blades having their inner edges spaced from said shaft carrying the rotor, said blades acting as a centrifugal pump for feeding the peripheral rotor blades, an annular recess concentric with the stator and provided in the stator side wall facing the rotor wall opposed to the one carrying said auxiliary blades, said recess being arranged inwardly of the inner edges of the rotor blades, an annular baffle arranged in front of said annular recess and situated between the rotor discs and stator and a vent communicating with said recess and opening to the atmosphere at a level higher than the top region of the bladed zones of the rotor and stator, a first conduit interposed between said reservoir and a zone inside the stator situated between said shaft carrying the rotor and the inner edges of said auxiliary blades, a wide-mouthed intake formed at the periphery of the stator in front of the outer edges of the rotor blades, a second conduit interposed between said wide-mouthed intake and said heat exchanger, a third conduit interposed between said heat exchanger and said annular recess in the stator communicating with said vent, a one-way valve arranged in said first conduit, a three-way valve arranged in said second conduit, and a fourth conduit connecting one way of said three-way valve to a point in said first conduit situated between said one-way valve and said reservoir, said valves being so arranged that said one-way valve is open when said three-way valve leaves free the communication between said wide-mouthed intake and said heat exchanger and intercepts said fourth conduit, and is closed when said three-way valve leaves free that the communication between said wide-mouthed intake and said fourth conduit and simultaneously intercepts the communication with said heat exchanger, means being provided for simultaneously operating said valves to afford their above mentioned function.

References Cited in the file of this patent

UNITED STATES PATENTS

| | | |
|---|---|---|
| 2,768,711 | Cline | Oct. 30, 1956 |
| 2,790,518 | Wilson | Apr. 30, 1957 |
| 2,827,133 | Schneider | Mar. 18, 1958 |
| 2,827,989 | Christenson | Mar. 25, 1958 |
| 2,889,013 | Schneider | June 2, 1959 |
| 2,990,919 | Christenson et al. | July 4, 1961 |